Patented Sept. 9, 1952

2,610,204

UNITED STATES PATENT OFFICE 2,610,204

SYNTHESIS OF 1,5-KETOALDEHYDES

Owen A. Moe and Donald T. Warner, Minneapolis, Minn., assignors to General Mills, Inc., a corporation of Delaware No Drawing. Application January 25, 1947,
Serial No. 724,460

5 Claims. (Cl. 260—483)

The present invention relates to the synthesis of 1,5-ketoaldehydes having the following general formula:

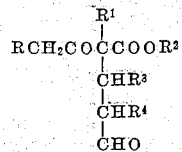

in which R, $R^1$, $R^2$, $R^3$ and $R^4$ may be alike or different and may be selected from the group consisting of hydrogen and low aliphatic groups such as methyl, ethyl, propyl, etc.

It will be apparent that the above type of compound contains a carbonyl group in the form of an ester group in addition to the 1,5-carbonyls. Ketoaldehydes of this type have not been readily available heretofore, but are made readily available in a pure form by means of the present invention. These aldehydes are extremely reactive, which makes them particularly useful in organic syntheses, as will be apparent more fully hereinafter.

It is, therefore, an object of the present invention to provide novel 1,5-ketoaldehydes of the above type.

It is a further object of the present invention to provide a process of preparing such ketoaldehydes.

Our invention is based on the discovery that beta-keto esters add in a 1,4 manner to alpha, beta-unsaturated aldehydes in accordance with the following equation:

$$RCH_2COCHCOOR^2 + R^3CH=C-CHO$$
$$\quad\quad | \quad\quad\quad\quad\quad\quad |$$
$$\quad\quad R^1 \quad\quad\quad\quad\quad\quad R^4$$

↓

$$RCH_2COCCOOR^2$$
$$\quad\quad\quad |$$
$$\quad\quad\quad CHR^3$$
$$\quad\quad\quad |$$
$$\quad\quad\quad CHR^4$$
$$\quad\quad\quad |$$
$$\quad\quad\quad CHO$$

in which R, $R^1$, $R^2$, $R^3$ and $R^4$ are as above defined. Typical of these additions is the addition of ethyl acetoacetate to acrolein. This addition may be carried out in the presence of a catalytic amount of an alkaline catalyst, such as sodium ethoxide, at a low temperature. This reaction occurs readily at temperatures around 0° C. and the resulting 1,5-ketoaldehyde may be isolated and purified by distillation under reduced pressure. The details of the process will be more fully apparent from the example given hereinafter.

In addition to the use of ethyl acetoacetate in this reaction, it will be apparent that other esters of acetoacetic acids, such as methyl, propyl, and like esters, are suitable. It is likewise possible to have a low aliphatic substituent such as methyl, ethyl, propyl, etc. attached to the methylene group intermediate the carbonyl groups. The aceto group may be similarly substituted with a low aliphatic group. Variation is also possible in the alpha,beta-unsaturated aldehyde employed. In addition to acrolein, those aldehydes in which the alpha or beta carbon atoms are substituted with low aliphatic groups may be used. Such compounds as crotonaldehyde and methacrolein are examples of suitable aldehydes. The reaction conditions are essentially the same for the various compounds employed.

These 1,5-ketoaldehydes are extremely reactive and are suitable for use in further organic synthesis. For example, gamma-acetyl-gamma-carbethoxy butyraldehyde is a useful intermediate in the preparation of gamma-acetamido-gamma-carbethoxy butyraldehyde, which in turn may be used in the synthesis of tryptophane. These reactions are illustrated as follows:

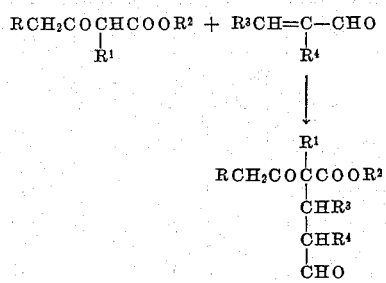

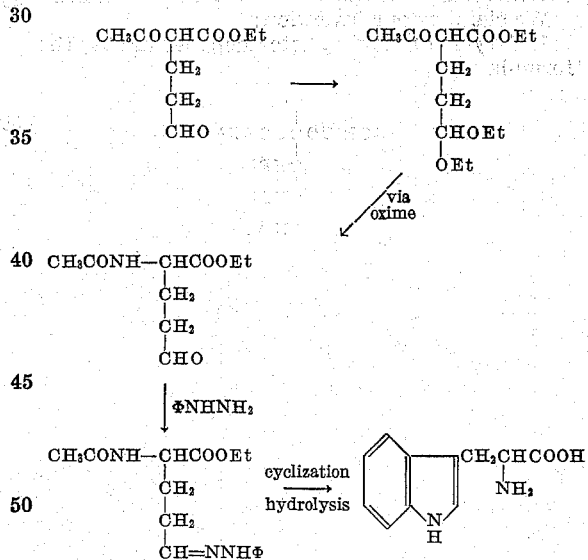

The following example will serve to illustrate the invention:

EXAMPLE

*Preparation of gamma-acetyl-gamma-carbethoxy butyraldehyde*

40 mg. of metallic sodium were added to 200 ml. of absolute ethyl alcohol and after all of the sodium had reacted 52.2 g. of ethyl acetoacetate were added. The resulting reaction mixture was cooled to 3° C. and 23.2 g. of acrolein (containing 1% hydroquinone) was added dropwise with stirring. During the addition of the unsaturated aldehydo compound the temperature was maintained at 0° to 6° C. The resulting reaction mixture was placed in a refrigerator overnight. The neutralization of the catalyst was accomplished by the addition of the calculated amount of glacial acetic acid. The reaction mixture was then concentrated in vacuo and benzene was added followed by concentration in vacuo. The resulting viscous residue was dissolved in 250 ml. of benzene and the benzene solution was extracted with water. The benzene layer was dried over anhydrous sodium sulfate and after filtration the benzene was removed by distillation under diminished pressure. The residual viscous oil thus obtained was subjected to distillation in vacuo. The product was collected over the range 60–124° C. at 0.25 to 0.7 mm. However, the major portion of the product was collected at 90–105° C. at 0.25 to 0.35 mm. A sample of the product collected at this latter temperature had a $n_D^{25°}$ 1.4437. The product thus obtained was redistilled under diminished pressure and four fractions were obtained. The first fraction was very small and it was collected at 36–38° C. at 0.2 mm., $n_D^{25°}$ 1.4216. The somewhat larger second fraction was collected over the range 75–82° C. at 0.2 mm., $n_D^{25°}$ 1.4410. The large major fraction was collected at 82° C. at 0.18 mm., $n_D^{25°}$ 1.4426. The fourth fraction was small and it was collected over the range 82–86° C. at 0.18 mm., $n_D^{25°}$ 1.4442. Fraction three represented substantially pure gamma-acetyl-gamma-carbethoxy butyraldehyde; and fractions two and four contained preponderant amounts of the same aldehydo compound.

While various modifications of the present invention have been disclosed, it is to be understood that the same is not limited thereto, but may be varied within the scope of the following claims.

We claim as our invention:

1. Process of making ketoaldehydes having the formula

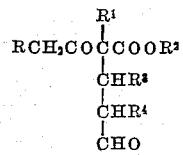

in which R, R¹, R², R³, and R⁴ are selected from the group consisting of hydrogen and low alkyl groups, which comprises reacting a ketone having the following formula:

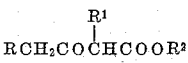

with an alpha, beta unsaturated aldehyde having the formula:

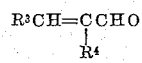

in which R, R¹, R², R³, and R⁴ are as above defined, in the presence of a solvent diluent, at a low temperature and in the presence of a catalytic amount of an alkaline catalyst.

2. Process of producing gamma-acetyl-gamma-carbethoxy butyraldehyde which comprises reacting acetoacetic ester with acrolein, in the presence of a solvent diluent, at a low temperature and in the presence of a catalytic amount of an alkaline catalyst.

3. Process of producing beta-methyl-gamma-acetyl-gamma-carbethoxy butyraldehyde which comprises reacting acetoacetic ester with crotonaldehyde, in the presence of a solvent diluent, at a low temperature and in the presence of a catalytic amount of an alkaline catalyst.

4. Process of producing alpha-methyl-gamma-acetyl-gamma-carbethoxy butyraldehyde which comprises reacting acetoacetic ester with methacrolein, in the presence of a solvent diluent, at a low temperature and in the presence of a catalytic amount of an alkaline catalyst.

5. Process of producing gamma-acetyl-gamma-alkyl-gamma-carbethoxy butyraldehyde which comprises reacting an alpha-alkyl substituted acetoacetic ester with acrolein, in the presence of a solvent diluent, at a low temperature and in the presence of a catalytic amount of an alkaline catalyst.

OWEN A. MOE.
DONALD T. WARNER.

REFERENCES CITED

The following references are of record in the file of this patent:

UNITED STATES PATENTS

| Number | Name | Date |
|---|---|---|
| 2,093,519 | Hamann | Sept. 21, 1937 |

OTHER REFERENCES

Serial No. 374,864, Wiest (A. P. C.), published June 15, 1943.

Perkin: J. C. S., vol. 99, pp. 738–739, 2 pp.